No. 683,473.  
J. S. KURTZ.  
CORN HARVESTER.  
(Application filed May 24, 1898.)  
Patented Oct. 1, 1901.

(No Model.)  
3 Sheets—Sheet 1.

WITNESSES  
G. F. Downing  
S. W. Foster

INVENTOR  
J. S. Kurtz  
By H. A. Seymour  
Attorney

No. 683,473. Patented Oct. 1, 1901.
J. S. KURTZ.
CORN HARVESTER.
(Application filed May 24, 1898.)
(No Model.) 3 Sheets—Sheet 2.
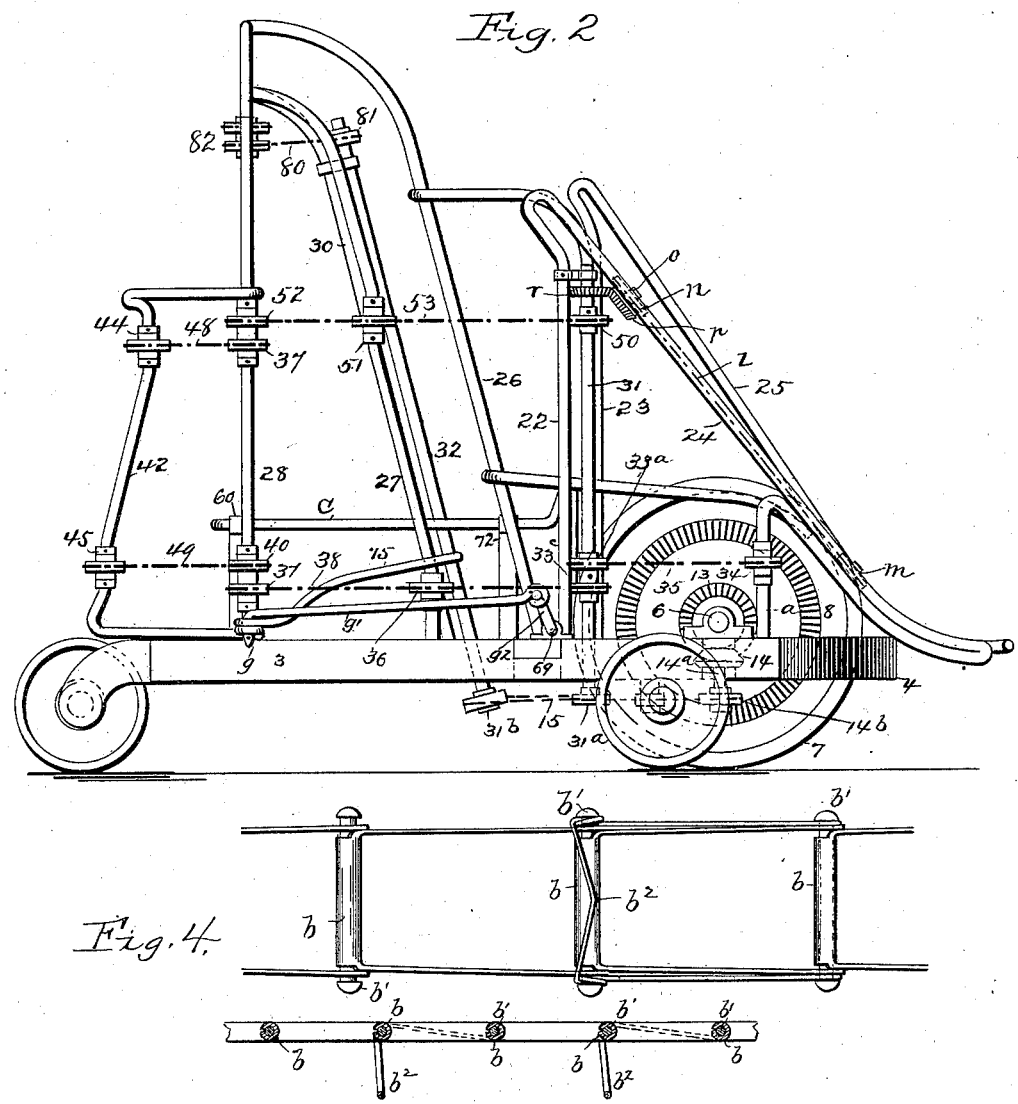

No. 683,473. Patented Oct. 1, 1901.
J. S. KURTZ.
CORN HARVESTER.
(Application filed May 24, 1898.)

(No Model.) 3 Sheets—Sheet 3.

WITNESSES
G. F. Downing
S. W. Foster

INVENTOR
J. S. Kurtz
By H. A. Seymour
Attorney

UNITED STATES PATENT OFFICE.

JOHN S. KURTZ, OF MARTINDALE, PENNSYLVANIA.

CORN-HARVESTER.

SPECIFICATION forming part of Letters Patent No. 683,473, dated October 1, 1901.

Application filed May 24, 1898. Serial No. 681,589. (No model.)

*To all whom it may concern:*

Be it known that I, JOHN S. KURTZ, a resident of Martindale, in the county of Lancaster and State of Pennsylvania, have invented certain new and useful Improvements in Corn-Harvesters; and I do hereby declare the following to be a full, clear, and exact description of the invention, such as will enable others skilled in the art to which it appertains to make and use the same.

My invention relates to an improvement in corn-harvesters, the object of the invention being to provide a machine that will cut, gather, bind, and drop the stalks in shocks automatically.

A further object is to provide a machine that will gather the stalks in an upright position, pack same in a holder, bind same when so packed, and automatically drop the bound shock and simultaneously cut off the supply of stalks to the bundle-holder.

A further object is to provide a bundle-holder for a corn-harvester which shall be composed of two movable wings or platforms and with two gates which will operate automatically and simultaneously with the inclining of the platforms.

A further object is to provide a corn-harvester that will be simple in construction, comparatively cheap to manufacture, neat in appearance, light and durable, and which will be most effectual when in operation.

With these objects in view the invention consists in certain novel features of construction and combinations and arrangements of parts, as will be more fully hereinafter described, and pointed out in the claims.

Figure 1:
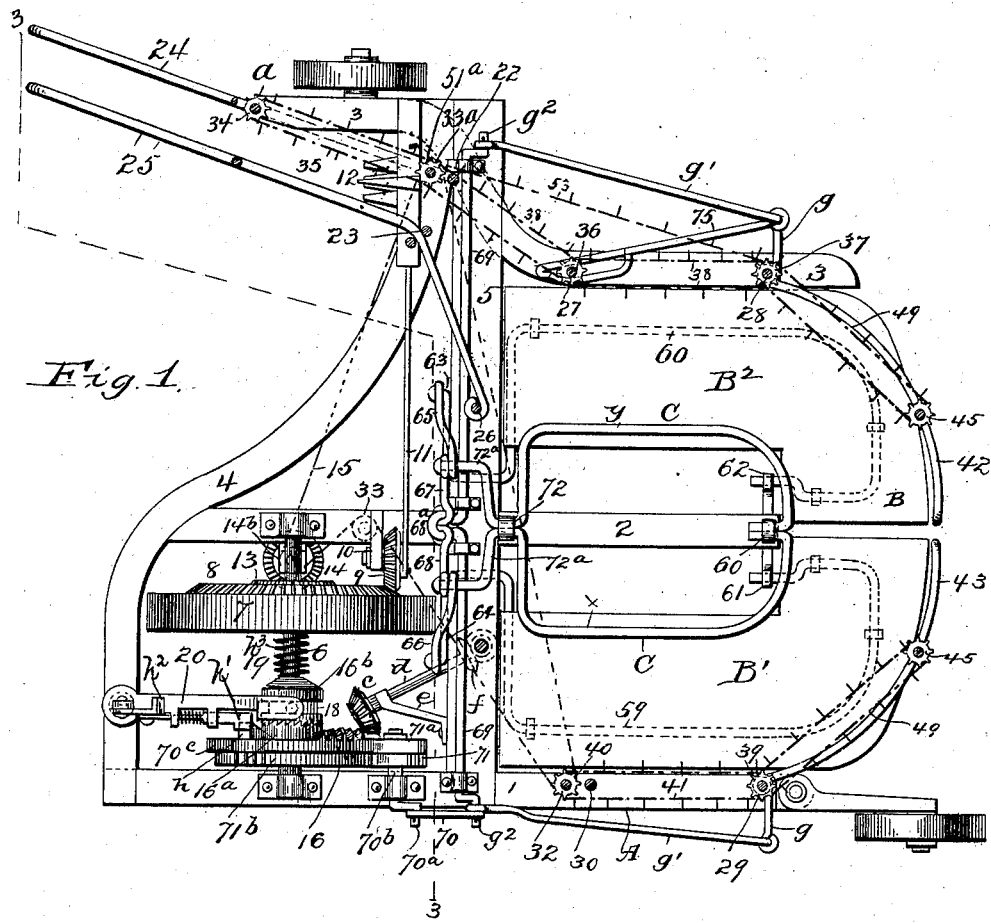
Figure 6:
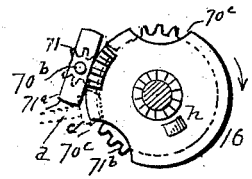
Figure 5:
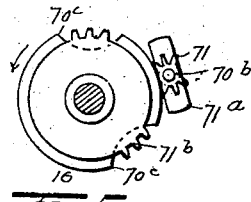
Figure 3:
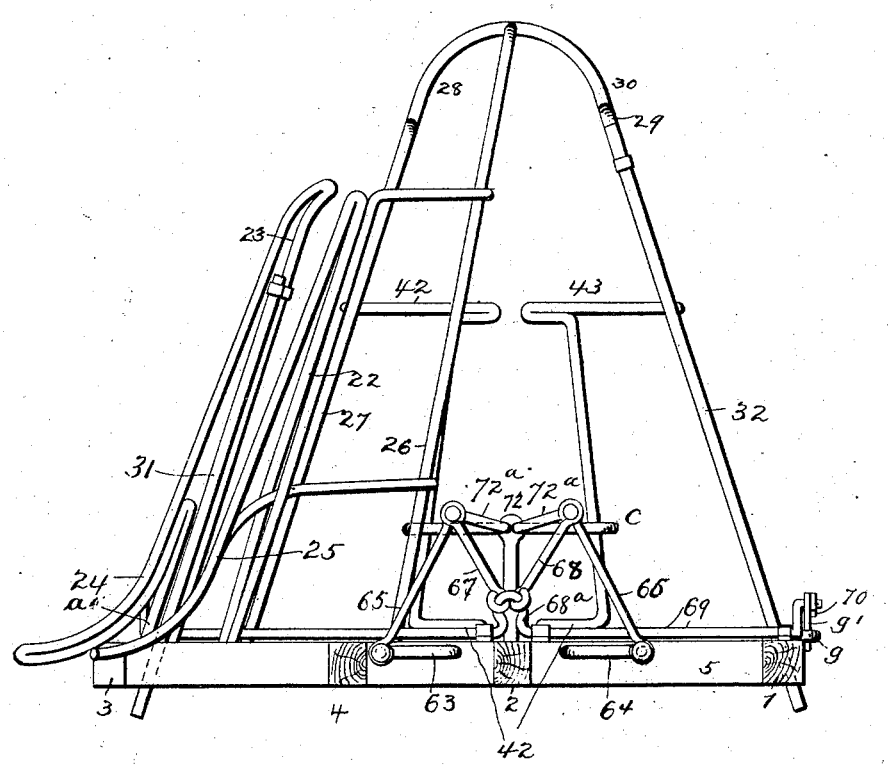

In the accompanying drawings, Figure 1 is a plan view. Fig. 2 is a side view. Fig. 3 is a front view partly in section and with the operating mechanism removed, and Fig. 4 is a detail view. Figs. 5 and 6 are detail views taken from opposite sides of the disk 16 and coöperating parts.

A represents a base or platform, which is composed of three parallel longitudinal timbers 1 2 3 and two horizontal timbers 4 5. A shaft 6 is journaled at one end in timber 1 and at its other end in timber 2. The shaft 6 has secured thereon a main wheel 7, to which is secured a bevel-gear 8, adapted to mesh with a cog-wheel 9, journaled in an arm 10, extending from the timber 2. A pitman 11 is attached to a crank-pin on one side of said wheel 9 and adapted to operate the cutting mechanism 12, which latter is constructed in any approved way.

A bevel-gear 13 of smaller size than the gear 8 is secured to the latter and adapted to mesh with a cog-wheel 14, journaled in a bracket secured to timber 2. The shaft $14^a$, on which cog-wheel 14 is secured, projects downwardly and at its lower end is provided with a pulley $14^b$, adapted to receive a belt 15, which will be more fully hereinafter described.

A mutilated gear or cam disk 16 is mounted loosely on the shaft 6 and provided with a clutch-section $16^a$ to be engaged by another clutch-section $16^b$, mounted to rotate with but slide on the shaft 6.

The sleeve $16^b$ is provided with an annular groove 18, adapted to receive pins 19 on a lever 20, whereby to move the sleeve on the shaft to engage or disengage the clutch-sections.

Two uprights 22 23 are spaced apart and secured to the timber 4, at or near one end thereof, and are provided with forwardly and downwardly extending guide-arms 24 25, adapted to direct the cornstalks into the machine. The end of guide 24 is bent upon itself and then bent downward, so as to form an upright $a$, the lower end of which is secured to the forward end of timber 3. The end of guide 25 is bent upon itself, extended rearwardly, and secured to an upright 26 on timber 5.

A gathering-chain $l$ is provided on the guide-arm 24 and is adapted to turn on an idle sprocket-wheel $m$ at the forward end of the guard-arm and around another sprocket-wheel $n$, secured on a shaft $o$, journaled at one end in the guide 24 and provided at its other end with a bevel-gear $p$, adapted to mesh with a bevel-gear $r$ on the end of shaft 31 and be turned thereby. The object of this chain is to raise fallen stalks.

Uprights 27, 28, 29, and 30 are secured at their lower ends to the frame and are preferably secured together with upright 26 at their upper end by any approved means.

A revoluble shaft 31 is journaled at one end of timber 4 and is adapted to extend below said timber, where it is provided with a pulley 31ª. Another upright 32 is journaled in timber 1 and has secured to its end below said timber a pulley 31ᵇ. The belt 15 is adapted to pass around the pulley 31ª, thence around pulley 31ᵇ, thence around an idle pulley 33, and thence back to pulley 14ᵇ.

Two sprocket-wheels 33ª 33ᵇ are secured to shaft 31. A sprocket-wheel 34 is revolubly mounted on the upright $a$ and is adapted to receive an endless sprocket-chain 35, which also passes about the sprocket-wheel 33ª. Sprocket-wheels 36 and 37 are revolubly connected with uprights 27 and 28, respectively, and are adapted to receive a sprocket-chain 38. Sprocket-wheels 39 and 40 are provided on shaft 32 and upright 29, respectively, and are connected by a sprocket-chain 41.

Gates 42 43 are hinged to uprights 28 and 29, and each is provided with sprocket-wheels 44 45. The sprocket-wheel 44 is connected with sprocket-wheel 37 by a chain 48, and sprocket-wheel 45 is connected with sprocket-wheel 40 by a chain 49. Sprocket-wheels 50, 51, and 52 are provided on shaft 31 and uprights 27 and 28, respectively, which are connected by a sprocket-chain 53. Similar sprocket-wheels are arranged on gate 43 to those on gate 42 and on uprights 29 and 32 as those on uprights 28 and 29 and are connected together by similar sprocket-chains to those described for gate 42.

I prefer to employ as a sprocket-chain the form shown in Fig. 4, in which each link is shown as bent between its ends to form an eye $b$ to receive a pin $b'$, which pivotally connects the other link also at its ends. The sprocket-chains constitute feeders for the stalks to the bundle-holder and are provided with fingers $b^2$. In forming these fingers a piece of spring-wire is bent between its ends to form the finger and then bent around one of the pivot-pins of the chain and then again extended to the next pivot-pin and secured thereto. These wire fingers are arranged at intervals along the chain whereby to facilitate the movement of the stalks.

A sprocket-chain 80 is provided in the upper portion of the frame and passes about sprocket-wheels 81 and 82 on uprights 28 and 29, to which motion is transmitted by a chain from a sprocket-wheel on shaft 32.

A platform B, composed of two wings or sections B' and B², is provided with metal braces or supports 59 60, which are adapted to be received in eyes 61 62, secured to the rear end of timber 2. The forward ends of the supports 59 60 pass through holes in the timber 5 and are provided at the forward ends with arms 63 64, which are connected with arms 67 68 by means of rods 65 66, and said arms 67 68 are connected with and operated by a crank-arm 68ª on shaft 69, the latter being connected at one end with an arm 70, adapted to be operated by a crank-arm 70ª on a shaft 70ᵇ.

A mutilated gear 71, having teeth at diametrically opposite points, is secured to the shaft 70ᵇ and provided with an enlargement 71ª, adapted to be actuated by the cam-periphery 70ᶜ of the wheel 16, whereby to turn the mutilated gear and insure the engagement therewith of the teeth of another mutilated gear 71ᵇ, the teeth of which latter are disposed at approximately diametrically opposite points. The mutilated gear 71ᵇ is mounted to rotate with the wheel 16. Hence it will be seen that normally the wheel 71 is at rest and is only periodically turned. The cam-disk 16 is adapted to transmit motion to a bevel-pinion $c$ on one end of a shaft $d$. The shaft $d$ is mounted in a bracket $e$, secured to timber 5, and its other end is provided with a bevel-pinion $f$, adapted to operate any approved binding mechanism.

A spreader C, composed, preferably, of stout wire, is made in two sections $x$ $y$, and one end of each section is bent around and journaled in an eye in a standard or upright 60 on timber 2. The forward ends of said sections $x$ $y$ are bent and adapted to pass through an eye in an upright or standard 72 in said timber 2. The forward ends of said sections are bent to form crank-arms 72ª, which are pivotally connected with the ends of arms 66 67 and 68 65, whereby when the movable platform is tilted the spreader wings or sections $x$ $y$ will be folded to allow the bound shock to drop out freely from the bundle-holder.

The gates 42 43, mounted on the uprights 28 29, are provided with crank-arms $g$, connected, by means of pitmen $g'$, with crank-arms $g^2$ at the respective ends of the shaft 69, whereby when the platform is dropped and the spreader folded the gates will be thrown open to eject the bound shock. A rod 75 is attached to one of the arms $g$ and bent to form a slot to move on upright 27, so that when the gates are opened said rod 75 will serve to close the passage and cut off the ingress of stalks to the bundle-holder.

The operation of the machine is as follows: The arms or guides 24 25 receive the stalks between them and guide same to the cutting mechanism 12. After having been cut, the stalks are conveyed by the feed-chains to the platform around the spreader until the platform is full, when the operator throws the lever 20, which forces the clutch-sections 16ª and 16ᵇ together. Motion will then be transmitted to the wheel 16, and its first office will be to turn the gear $c$ and operate the binding mechanism, (not shown,) this operation having just been completed when the pinion $c$ and the teeth on the face of the wheel 16 are in the relative positions shown in Figs. 1 and 6. The cam-periphery of wheel 16 will then coöperate with the enlargement 71ª on the mutilated gear 71 to throw the latter in position to mesh with the teeth of wheel 16. Motion thus imparted to the gear 71 will be transmitted through shaft 70ᵇ and crank-arm 70ª, arm 70, shaft 69, and arms 67 68 and 65 66 to the platform, whereby to cause the bound shock to be discharged, and through arms 72ª to the spreader and simultaneously transmit motion from arms 70, through pitmen $g'$, to the gates 42 and 43 to open same to permit the exit of the bound shock. When the gates open, the rod 75, connected to one of the arms $g$, will be forced forward and effectually close the passage and shut off the supply of stalks to the platform. When the bound shocks shall have been dropped, the wheel 16 will again strike the enlargement 71ª and through the same mechanism, as before described, transmit motion to raise the sections of platform, spread the spreader, close the gates, and open the passage to permit the inflow of stalks. When the device is in its position to receive stalks after a shock has been dropped, a cam or projection $h$ on the wheel 16 will strike a dog $h'$ on the lever 20 and throw the lever 20 away from the wheel, and thus separate the clutch-sections, when the machine is again ready to repeat the operation above described to cut the stalks and feed them to the platform, and then after the dog $h'$ has been moved out of the path of cam or projection $h$ by means of a foot-lever $h^2$ and the spring $h^3$ has forced the clutch-sections together to cause the operation of the binding and discharging devices, as has been explained.

Various slight changes might be made in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a corn-harvester, the combination with a frame, of a normally-stationary platform comprising two hinged members, cutting mechanism, gates at one end of the platform, a series of feeding-chains partially embracing the platform and adapted to convey the stalks from the cutter and assemble them upon the platform, a spreader comprising two hinged members disposed over the platform, a driving-shaft, operating means between said shaft and the hinged members of the platform, the hinged members of the spreader and the gates for actuating them simultaneously to effect the discharge of a shock and gearing between said driving-shaft and the cutting mechanism and feeding-chains.

2. In a corn-harvester, the combination with a frame, of guides on said frame to receive the stalks, a stalk-holder, a platform made in two movable sections, gates on the frame, a spreader in the holder having two movable sections, and chains in said frame partially surrounding the frame and adapted to pack the stalks on said platform around the spreader, an arm on one of said gates adapted when the gates are opened to shut off the supply of stalks to the holder and means for operating said parts.

3. In a corn-harvester, the combination with a frame, of a main shaft, a main wheel on said shaft, a loose mutilated gear on the shaft provided with a clutch-section, a movable clutch-section on said shaft adapted to mesh with the first-mentioned clutch-section, a lever for operating the clutch secured on the shaft and a projection on the wheel adapted to engage the lever and throw the clutches apart, substantially as set forth.

4. In a corn-harvester, the combination with a shock or bundle holder, of a cutter and feed-chains disposed at both sides and one end of said shock or bundle holder and adapted to pack the stalks within said holder, substantially as set forth.

5. In a corn-harvester, the combination with a shock or bundle holder, and cutting mechanism, of a series of feed-chains constructed and arranged to feed stalks to the cutting mechanism and then pack the same in the holder, some of said feed-chains being disposed at the sides and end of said holder, substantially as set forth.

6. In a corn-harvester, the combination with a shock or bundle holder, discharging means therefor, a spreader in said holder and binder-gearing, of a main shaft, a mutilated gear thereon having a cam-periphery, a clutch for locking said mutilated gear to the shaft, said mutilated gear adapted to transmit motion to the binder-gearing, a secondary mutilated gear adapted to rotate with the first-mentioned mutilated gear a crank-shaft, connections between said crank-shaft and the spreader and the discharging means of the shock or bundle holder, a mutilated gear on the crank-shaft to receive motion from said secondary mutilated gear, and a cam or enlargement mounted to rotate with the mutilated gear on the crank-shaft and adapted to be actuated by the cam-periphery of the first-mentioned mutilated gear, substantially as set forth.

In testimony whereof I have signed this specification in the presence of two subscribing witnesses.

JOHN S. KURTZ.

Witnesses:
M. S. McCAA,
D. J. McCAA.